Figure 1:
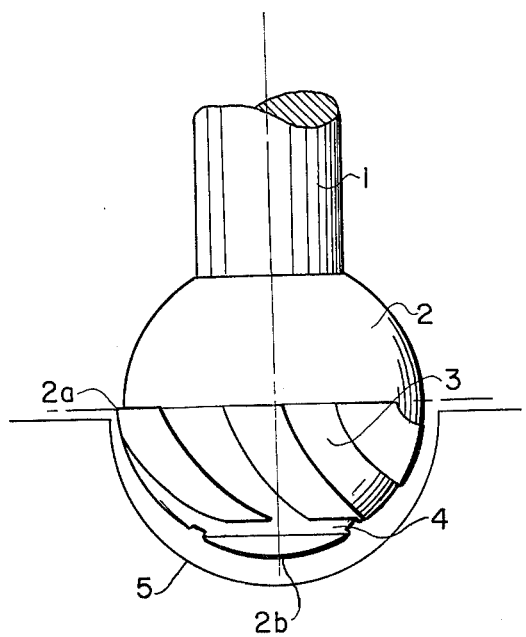

United States Patent

Hepp et al.

[11] 3,883,193
[45] May 13, 1975

[54] PEDESTAL BEARING WITH SPIRAL GROOVES IN THE BEARING GLIDING PLANE

[75] Inventors: Wolfgang Hepp, Immenstaad; Klaus Pimiskern, Friedrichshafen; Werner Herbert, Markdorf, all of Germany

[73] Assignee: Dornier System GmbH, Friedrichshafen, Germany

[22] Filed: June 25, 1973

[21] Appl. No.: 373,137

[30] Foreign Application Priority Data
Aug. 11, 1972   Germany.............................. 2239624

[52] U.S. Cl. ..................................................... 308/9
[51] Int. Cl. ............................................. F16c 35/00
[58] Field of Search ......................................... 308/9

[56] References Cited
UNITED STATES PATENTS
3,063,041   11/1962   Quade et al. ........................... 308/9
3,154,353   10/1964   Haringx et al. ........................ 308/9
3,265,452   8/1966    Pan et al. ................................ 308/9
3,376,083   4/1968    Muijderman ........................... 308/9

Primary Examiner—M. Henson Wood, Jr.
Assistant Examiner—Robert Saifer
Attorney, Agent, or Firm—James E. Bryan

[57] ABSTRACT

This invention relates to an improvement in a pedestal bearing having spiral-shaped oil grooves in the bearing gliding surface, the improvement comprising a continuous annular groove in the bearing gliding surface, said groove being in the area near the center of rotation of the bearing end and concentric thereto, and all of said spiral-shaped oil grooves terminating in said annular groove.

2 Claims, 2 Drawing Figures

3,883,193

PEDESTAL BEARING WITH SPIRAL GROOVES IN THE BEARING GLIDING PLANE

The present invention relates to a pedestal bearing with spiral grooves in the bearing gliding plane or surface.

In such a spiral groove bearing, an existing lubricant is conveyed, through the grooves disposed at the surface of the rotating bearing part, from the outside toward the center of the bearing, whereby a pressure buildup is produced. Such spiral groove bearings are known in a planar or also conical and/or spherical shape.

Known spiral groove bearings having a spherical shape, which consist of a stationary bearing part having a hemispherical recess and of a rotating shaft having a spherical shaft end, and wherein the bearing gliding plane or surface of the shaft end has spirally-extending grooves starting from the equator of the spherical gliding surface and extending in the direction toward the pole of the sphere, convey or feed lubricants toward the bearing center and thus achieve a pressure buildup, and therewith a supporting lubricating film. During the starting operation of such spiral groove bearings, direct contact is produced between the bearing gliding surfaces until the supporting or load-bearing lubricating film is produced by the spiral grooves. Because of this direct contact of the bearing gliding surfaces, and as a result of abrasion, solid particles may be produced which, in the course of operation of the bearings, act as a kind of emery substance and damage the bearing gliding surfaces. This occurs particularly due to the fact that, during the reversal of the oil flow at the pole-side groove end, the solid particles impinge upon the bearing gliding surface, thus causing an erosion in long-term operation which becomes manifest in the form of a groove in the bearing gliding surface of the hemispherical recess.

The aforementioned factors have a very strong influence upon the service life of spiral groove bearings, particularly during short-term operation, when the starting process is repeated frequently.

It is the object of the present invention to eliminate the disadvantages referred to hereinabove and to provide spiral groove bearings which have a longer service life. The present invention is intended to be applicable to all kinds of spiral groove bearings.

This object is obtained, in accordance with the present invention by virtue of the fact that in the area near the center of rotation of the shaft end and concentric with respect thereto, a continuous annular groove is disposed within the bearing gliding surface, and by virtue of the fact that all of the spirally-shaped oil grooves terminate in the aforementioned annular groove.

This arrangement of an annular groove near the center of rotation and into which all of the oil grooves terminate, affords the advantage that the solid particles present within the bearing gliding surface are fed through the oil grooves to the annular groove and collected there. The annular groove acts in this case as a reservoir for the deposit of solid particles, thereby preventing the emery effect which causes abrasion. Furthermore, the annular groove or tee-slot dampens the reversing procedure of the lubricating medium so that the impinging velocity of the solid particles upon the bearing gliding surface of the hemispherical recess is reduced.

A further resultant advantage resides in a pressure compensation of the lubricating medium between the various oil grooves since all of the oil grooves are connected with each other by the annular groove.

Figure 2:
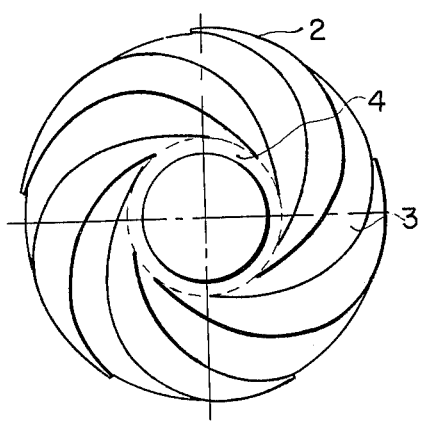

One embodiment of the present invention will now be further described hereinafter for a spherical shape of the spiral groove bearing, taken in connection with and with reference to the accompanying drawings, wherein FIG. 1 illustrates the spherical shaft end of an axis of rotation with the spiral groove pattern being present in the gliding surface, and FIG. 2 is a bottom plan view of the groove pattern.

FIG. 1 illustrates a shaft 1 having a spherical shaft end 2. The sphere represents a bearing sliding or gliding surface and has oil grooves 3 extending spirally from the equator 2a of the sphere in the direction toward the pole 2b. In the area or region of the pole 2b, a continuous annular groove or tee-slot 4 is shown in the sphere. Positioned at the dash-dotted line is the static ball socket 5 which does not require further description herein. The spherical cap or segment containing the pole 2b and being delimited by the annular groove 4 does not contain any grooves.

The oil grooves 3 which are present in the gliding surface of the bearing and extend spirally approximately from the equator 2a of the spherical shaft end 2 in the direction toward the pole 2b of the spherical shaft end 2 terminate in the continuous annular groove 4 which is positioned near the pole 2b. The lubricating medium (not shown herein) is fed through the oil grooves 3 in the direction toward the pole 2b and thereby produces a lubricating medium pressure between the gliding or sliding surfaces of the bearing parts 2 and 5. Due to the starting operation of the bearing from the standstill when no supporting lubricating film is as yet present, solid particles will be formed because of the friction of the two bearing gliding or sliding surfaces of the bearing parts 2 and 5 which, during operation, move as a kind of emergy substance between the bearing gliding surfaces and progressively impair the surface quality of the gliding or sliding surfaces. This holds true also for solid particles which are introduced during the bearing assembly, or are already present in the lubricating medium and accordingly pass into the bearing housing.

The continuous annular groove 4 which is connected with the spirally-extending oil grooves 3 collects these solid particles by virtue of the feeding direction of the lubricating medium through the oil grooves 3 and stores them so that the bearing gliding surfaces particularly in the area of the pole 2b no longer can be impaired.

The annular groove 4 affords the further advantage that a pressure compensation of the lubricating medium between the various oil grooves 3 is brought about, and operation of the bearing with less oscillations is effectively achieved thereby. The reversing operation of the lubricating medium is so dampened by the annular groove 4 that the impinging velocity of the solid particles upon the bearing gliding surface of the hemispherical recess will now be very low. The advantages referred to above result in a longer service life and greater reliability for the operation of such spiral groove bearings.

FIG. 2 represents the groove pattern of the spherical shaft end 2 in a bottom plan view thereof. The spirally-extending oil grooves 3 terminate in the annular groove 4. The cross-sectional surface of the terminating oil grooves 3 correspond if necessary in each case to the cross-sectional surface of the annular groove 4.

Practical tests have shown that the arrangement described hereinabove prevents to a very large extent the erosion in the bearing gliding surfaces also during long-term operation. The continuous annular groove may be used also on gliding surfaces which do not have a spherical configuration.

It will be obvious to those skilled in the art that many modifications may be made within the scope of the present invention without departing from the spirit thereof, and the invention includes all such modifications.

What is claimed is:

1. In an axial friction bearing comprising a stationary ball socket and a spherical bearing part provided on the surface thereof with spiral grooves, said spiral grooves terminating in the feed direction in a recess concentric to the pole of the sphere, the improvement comprising that said recess is a continuous annular groove in proximity to said pole, and that a smooth sphere portion is between said groove and said pole.

2. A bearing according to claim 1 in which the cross-sectional surface of each of said spiral grooves corresponds to the cross-sectional surface of the annular groove.

* * * * *